(Specimens.)
E. D. LIBBEY.
GLASSWARE.
No. 337,170. Patented Mar. 2, 1886.
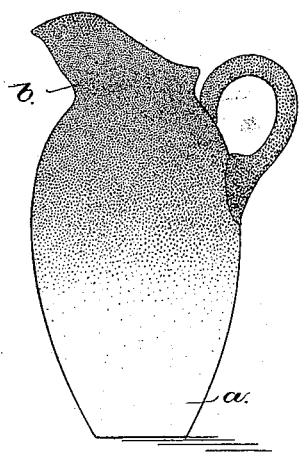
Witnesses.
Inventor.
Edward D. Libbey.
by Crosby & Gregory
attys.

UNITED STATES PATENT OFFICE.

EDWARD D. LIBBEY, OF WINCHESTER, MASSACHUSETTS.

GLASSWARE.

SPECIFICATION forming part of Letters Patent No. 337,170, dated March 2, 1886.

Application filed October 3, 1885. Serial No. 178,873. (Specimens.)

*To all whom it may concern:*

Be it known that I, EDWARD D. LIBBEY, of Winchester, county of Middlesex, and State of Massachusetts, have invented an Improvement in Glassware, of which the following description, in connection with the accompanying drawing, is a specification, like letters on the drawing representing like parts.

This invention has for its object the production of novel opaque glassware of attractive appearance.

My invention consists in glassware of homogeneous opaque material, opposite ends or different parts of the said article, although homogeneous material, presenting different colors or shades of colors blended together.

The drawing represents an article of glassware embodying my invention.

In the practice of my invention I take an ordinary opaque or opal glass mixture and add to it a quantity of glass mixture suitable for the production of what is known as "ruby-glass containing gold," the quantity of this last mixture being however variable, according to the density of the color to be developed by reheating the glass after cooling.

The opaque glass mixture and the ruby glass mixture referred to are melted to form a homogeneous body, and by usual processes is blown and shaped into an article of glassware of the shape which it is desired to produce. The article, having been shaped and somewhat cooled, is then reheated at that end or part of it which is to have a darker color developed upon it, the reheating being preferably at the "glory-hole." The end or part of the article so reheated will have developed upon it a color different from that due to the opaque or opal glass mixture if used alone, the developed color being entirely different from what would have been the color of the article had it not been partially reheated after being somewhat cooled.

In the drawing, *a* represents the part of the article (shown as a pitcher,) which is of the color due to the opaque glass mixture, the part *b* being that developed by reheating the shaped article.

It is obvious that I may produce from the glass mixture referred to any desired article of glassware, such as vases, jugs, &c.

An article produced from the glass mixture so far described would at the end *a* be of a white color, due to the opaque or opal glass mixture employed, and the developed color at *b*, due to the ruby glass mixture containing gold, would be a shade of red.

By methods and means familiar to all practical glass-makers the opaque glass mixture may be made to present various colors—as, for instance, the addition of a little uranium to the mixture will produce an opaque glass of a yellow color, while copper or cobalt will produce a blue color. Other different metallic oxides will produce yet other colors.

I claim—

As an improved article of manufacture, glassware of homogeneous opaque material, portions of which present different colors or shades of color blended together, substantially as described.

In testimony whereof I have signed my name to this specification in the presence of two subscribing witnesses.

EDWARD D. LIBBEY.

Witnesses:
 G. W. GREGORY,
 B. J. NOYES.